United States Patent [19]

Carter

[11] 4,140,869
[45] Feb. 20, 1979

[54] CONSTANT GRIP FLEXIBLE CONNECTOR FOR FLEXIBLE ELECTRICAL CONDUIT

[76] Inventor: Herschal B. Carter, 2033 W. Mulberry Dr., Phoenix, Ariz. 85015

[21] Appl. No.: 793,498

[22] Filed: May 4, 1977

[51] Int. Cl.² .............................................. H02G 3/06
[52] U.S. Cl. .................................. 174/65 R; 285/161
[58] Field of Search ..................... 174/65 R, 51, 78; 285/158, 161, 162, 189, DIG. 4

[56] References Cited

U.S. PATENT DOCUMENTS

| | | | |
|---|---|---|---|
| 2,505,312 | 4/1950 | Wagner | 285/161 |
| 3,639,677 | 2/1972 | Bain | 174/65 R X |
| 3,992,044 | 11/1976 | Muslin | 174/65 R X |

Primary Examiner—J. V. Truhe
Assistant Examiner—D. A. Tone
Attorney, Agent, or Firm—H. Gordon Shields

[57] ABSTRACT

Constant grip flexible connector apparatus for flexible electrical conduit is disclosed which comprises a coupling portion to provide a threaded engagement with the electrical conduit and a positive connection for electrical connection between the conduit and the connector and a threaded coupling for connection to a junction box.

2 Claims, 6 Drawing Figures

CONSTANT GRIP FLEXIBLE CONNECTOR FOR FLEXIBLE ELECTRICAL CONDUIT

BACKGROUND OF THE INVENTION

1. Field of the Invention

This invention relates to connectors, and, more particularly, to connector apparatus for flexible electrical conduit.

2. Description of the Prior Art

Flexible electrical conduit is required as an outer sheath for many types of electrical wiring within structures, such as between walls. The flexible conduit is formed of a continuous strip of steel which includes a pair of oppositely extending corrugations adjacent each other. The corrugations are not of equal size, and one corrugation is substantially larger than the other one. The steel strip is wrapped around itself in a helical fashion such that the large corrugation overlaps the adjacent smaller corrugation. In this manner a helical or spiral corrugation extends throughout the length of the conduit thus formed. The resulting conduit is flexible such that it will bend longitudinally, but the corrugation will not yield radially inwardly nor radially outwardly except under a substantial force. In other words, the flexible conduit is not deformable radially, but is bendable along its longitudinal axis to enable it to form a sheath of substantially continuous or constant diameter as it bends as required. Electrical conductors or wires extending through the flexible conduit are protected from damage from pinching, or the like, due to the relative rigidity of the walls of the flexible conduit.

The flexible conduit has the beneficial characteristics of strength and flexibility, but has a substantial disadvantage in that it is difficult, by prior art methods, to electrically connect the flexible conduit to a junction box at the termination of the conduit. The contemporary electrical codes require the grounding of the junction boxes at the termination of the conduit and the primary way of achieving such grounding, as approved by the Underwriters Laboratory, is simply to run a bare, third wire through the conduit with the insulated conductors and clamping the bare wire to the junction boxes. This obviously has its difficulties or its disadvantages due to the extra costs involved in terms of both labor and extra cable or electrical conductor required.

SUMMARY OF THE INVENTION

The invention described and claimed herein comprises a connector for flexible electrical conduit which threadedly engages the electrical conduit to provide electrical connection between the connector and the flexible conduit, and an additional electrical connection is provided to insure a direct electrical connection or short circuit between the connector and the flexible electrical conduit.

Among the objects of the present invention are the following:

To provide new and useful electrical connector apparatus;

To provide new and useful connector apparatus for flexible electrical conduit;

To provide a threaded engagement between a connector and flexible electrical conduit;

To provide new and useful connector apparatus for securing flexible electrical conduit to a junction box;

To provide new and useful apparatus for electrically connecting flexible electrical conduit to a junction box; and To provide new and useful apparatus for the electrical interconnection of flexible electrical conduit and a connector.

DESCRIPTION OF THE PREFERRED EMBODIMENT

Figure 1:
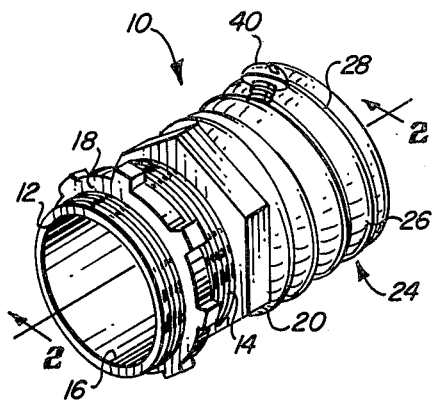
FIG. 1 is a perspective view of an embodiment of electrical connector apparatus of the present invention.

FIG. 1 is a perspective view of connector apparatus 10 embodying the present invention. The apparatus is used to connect flexible conduit to a junction box, and the like. The connector apparatus 10 includes a cylindrical portion 12 which is externally threaded as at 14 disposed on one side of a flange 20 from a helical coupling portion 24. The flange 20 preferably has a hexagonal outer circumference for ease of holding the connector as the cylindrical portion is inserted into a hole or aperture in a junction box wall. The wall of the junction box is disposed against the flange 20 and the flange is held by a wrench while a lock nut 18 is snugged against the wall of the junction box. The lock nut 18 threadedly engages the external threads 14 of the cylindrical portion 12. Within the cylindrical portion 12 is a bore 16. The bore 16 communicates directly with the interior of the helical coupling portion 24.

The helical coupling portion 24 is made of a continuous strip of metal, such as steel, wound on itself in helical fashion. The strip comprises an outer convex ridge portion 26 disposed between a pair of concave troughs or trough portions 28. The helical strip is wound on itself with a trough portion overlapping to define a continuous flexible conduit.

One of the ridges 26 includes a tapped aperture extending at an angle inwardly toward the interior of the connector apparatus. The angle between the tapped hole and the cylindrical portion of the connector apparatus is preferably an obtuse angle for convenience of installation. A screw 40 threadedly engages the tapped hole, and when a length of flexible conduit is inserted into the helical coupling portion 24, the screw 40 is tightened against the conduit to hold the connector and the conduit together.

Figure 2:
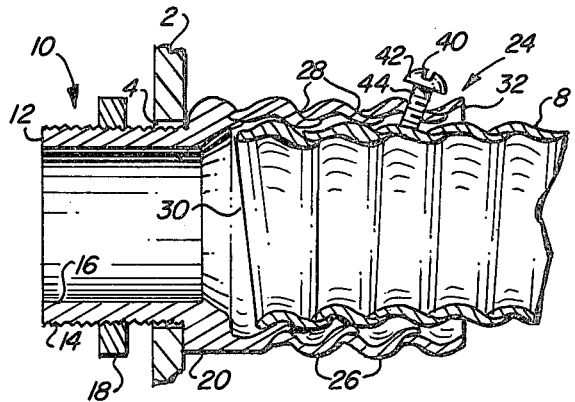
FIG. 2 is a view in partial section of the apparatus of FIG. 1 taken generally along line 2-2 of FIG. 1, but including a flexible conduit secured to the connector.

FIG. 2 is a view in partial section of the apparatus of FIG. 1, illustrating the use of the connector apparatus in coupling the connector apparatus to both a length of flexible conduit 8 and to a junction box wall 2. The cylindrical portion 12 of the connector apparatus 10 is shown extending through an aperture or hole 4 in the wall 2 of a junction box. The flange 20 of the connector apparatus 10 is disposed against the wall 2 of the junction box, and the lock nut 18, which is disposed within the junction box and on the external threads 14 of the cylindrical portion 12, is shown spaced apart slightly from the interior of the wall 2. The lock nut 18 will be snugged against the wall 2 so that the connector is held firmly to the wall. The bore 16 of the cylindrical portion 12 communicates directly with a bore 30 of the helical coupling portion 24.

The construction of the helical portion 24 is clearly shown in FIG. 2. With respect to the outside or exterior of the helical portion, a convex ridge 26 is disposed between adjacent concave trough portions 28, with the trough portions 28 overlapping each other to define the helical conduit. The helical coupling portion 24, with the convolutions of ridges and troughs, defines a flexible conduit portion which, with the adjacent ridges and troughs, defines a threaded element, in which the threads are curved and rounded instead of being generally flat.

It is the thread-like construction characteristic of the conduit which allows a flexible conduit 8 to be coupled or connected to the apparatus 10. The flexible conduit 8 is of substantially the same construction or manufacture as is the helical coupling portion 24 of the connector 10. That is, it comprises a helical winding of a continuous ridge disposed between a pair of troughs, with the troughs overlapping to define the flexible conduit. The dimensions of the flexible conduit 8 and the coupling portion 24 are such that the coupling portion can be threaded onto the conduit 8. The outer convolutions of the flexible conduit 8 accordingly engage the interior convolutions of the coupling portion 24, which define the interior or bore 30 of the coupling portion. The coupling portion terminates at an end 32 remote from the flange 20.

To secure the conduit 8 to the connector 10, a screw 40 is used. The screw 40 extends at an acute angle with respect to the longitudinal axis of the communicating bores 16 and 30 of the connector apparatus 10. A head 42 of the screw 40 extends generally away from the cylindrical portion 12 and spaced apart from the flange 20. The shank 44 of the screw 40 extends through an aperture or hole in one of the convolutions of the helical coupling portion 24, preferably through a ridge 26. The screw 40 may be of the self-tapping variety, requiring only a hole to be drilled or punched through the helical coupling portion.

The angle of the screw away from the flange 20 and the cylindrical portion 12 allows the screw to be installed easily and helps to lock the conduit to the connector. The spacing of one or two helical convolutions between the screw and the flange 20 insures that the screw 40 will contact the conduit 8 even if the conduit is not screwed all the way into the connector, or if the conduit is cut at an angle to its longitudinal axis other than perpendicular. Accordingly, it is preferable to locate the screw 40 adjacent the end 32 rather than adjacent the flange 20.

After the connector 10 is threaded onto or about the end of the flexible conduit 8, as illustrated in FIG. 2, the screw 40 may be snugged against the adjacent ridge of the flexible conduit to lock the conduit to the connector.

The threaded engagement between the flexible conduit and the flexible helical coupling portion of the connector apparatus 10 provides electrical continuity or connection between the connector and the conduit for grounding purposes, and the screw provides a means of locking the conduit and the connector together. The screw also insures that a good electrical connection is made between the conduit and the connector.

Figure 3:
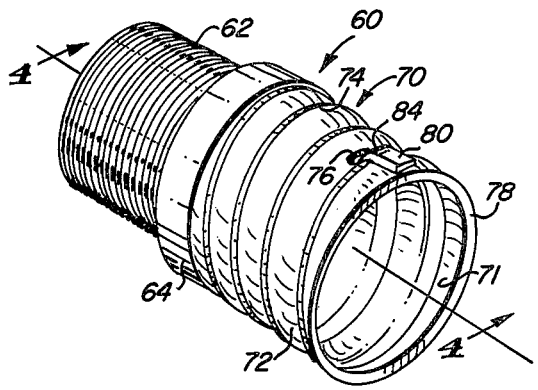
FIG. 3 is a perspective view of an alternate embodiment of FIGS. 1 and 2.

FIG. 3 is a perspective view of an alternate embodiment of the apparatus of FIG. 1. Connector apparatus 60 of FIG. 3 is substantially identical to connector apparatus 10 of FIGS. 1 and 2, with the exception of the element used to secure flexible conduit to the connector. The connector 60 includes an externally threaded cylindrical portion 62 and an adjacent flange portion 64. Remote from the threaded portion 62 is the helical coupling portion 70. That is, the flange portion 64 separates the coupling portion 70 from the threaded portion 62. The helical coupling portion 70 is substantially identical to the helical coupling portion 24 of FIGS. 1 and 2 in that it comprises a continuous helical winding of a strip of material, such as steel. The winding includes a convex ridge portion disposed between a pair of concave troughs, and the trough portions of the helical windings are overlapping to define a helical conduit. The conduit terminates at an end 80 remote from the flange 64.

A plurality of ridges 72 and troughs 74 accordingly extends helically and the adjacent troughs overlap to define a flexible, convoluted helical coupling portion 70. One of the ridges 72 includes a hole or aperture 76 extending through the ridge and commmunicating with a bore 71 on the interior of the helical coupling portion 70. Disposed adjacent the hole 76 is an end portion 84 of a tab 80. The tab 80 is a somewhat flexible, but relatively stiff, length of metal with a preferably rectangular cross sectional configuration. The tab comprises two portions, a blade portion 82 and an end portion 84. The blade portion is secured to a ridge 72, preferably as by welding remote from the flange 64, with the blade portion extending toward the flange. The blade 82 extends slightly upwardly from the exterior of the helical coupling portion so that the end portion 84 is disposed adjacent the hole or aperture 76. The end 84 extends from the blade 82 at an obtuse angle with respect to the longitudinal axis of the blade and is poised adjacent the hole or aperture 76.

Figure 4:
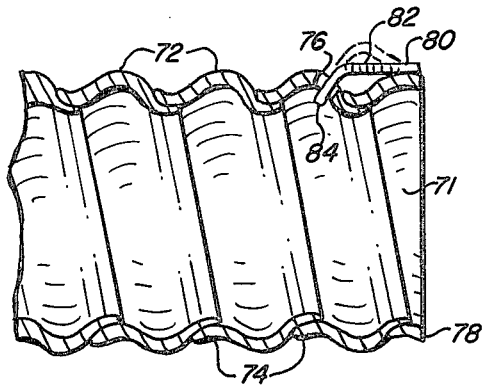
FIG. 4 is a view in partial section of a portion of the apparatus of FIG. 3 taken generally along line 4—4 of FIG. 3.

FIG. 4 is a view in partial section of a portion of the apparatus of FIG. 3, taken generally along line 4—4 of FIG. 3. FIG. 4 comprises a view in partial section of the helical coupling portion 70 of the connector apparatus 60 of FIG. 3. The tab 80 is secured to a ridge 72 preferably adjacent the end 78 of the helical coupling portion 70. While the exact location of the tab 80 is not critical, the tab is shown adjacent the end 78 of the helical coupling portion 70 and secured, as by welding, to a ridge 72. The advantages of locating the tab 80 adjacent the end 78 as opposed to adjacent the flange 64 are substantially the same as given above with respect to locating the screw 40 remote from the flange 20 and adjacent the end 32.

The hole or aperture 76 extends through the helical coupling portion preferably on the side of a convolution, or between the bottom of a trough 74 on the top of a ridge 72. After the helical portion 70 of the connector 60 threadedly engages a flexible conduit, the end 84 of the tab 80 is forced inwardly through the hole 76 to engage the exterior of the wall of the conduit disposed in the bore 71.

The end 84 is forced through the hole or aperture 76 by use of pliers which are disposed about the conduit and on the blade portion 82. When force is applied to the handles of the pliers, with one jaw of the pliers at the bottom of the conduit and the other jaw of the pliers on the blade 82, the force is applied to move the blade 82 downwardly with respect to the conduit, and the end 84 accordingly is forced through the hole or aperture 76 and against the exterior of the wall of the flexible conduit threadedly extending into the bore 71. The end 84 makes contact with the conduit within the coupling portion and prevents the conduit from coming out of the coupling portion. The end 84 prevents the conduit from threadedly disengaging itself from the coupling portion.

The tab 80 accomplishes substantially the identical purposes as the screw 40 of the embodiment of FIGS. 1 and 2 by securely locking the connector to the flexible conduit and by insuring a good electrical connection between the connector and the flexible conduit.

Figure 5:
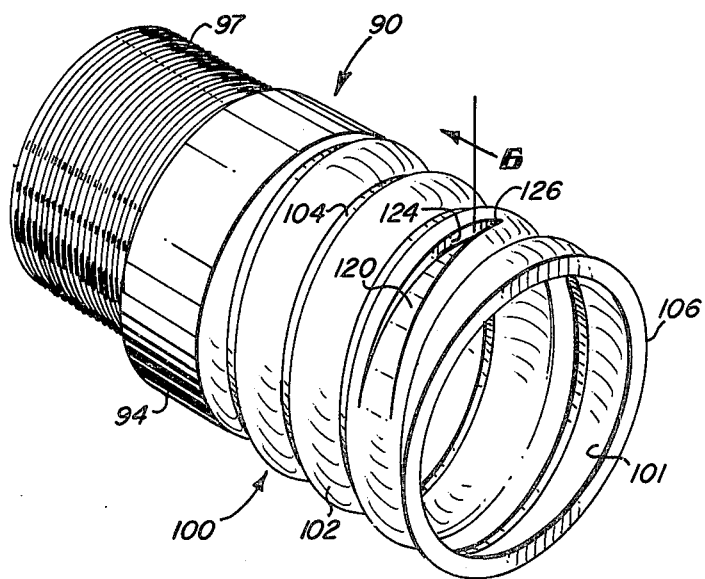
FIG. 5 is a perspective view of an alternate embodiment of the connector apparatus of the present invention.

FIG. 5 is a perspective view of an alternate embodiment of the connector apparatus of FIGS. 1-4. The embodiment illustrated in FIGS. 5 and 6 includes a locking tab extending downwardly from, and cut through, a convex ridge of the helical coupling portion.

A connector 90 shown in FIG. 5 includes a threaded portion 92 and a flange portion 94 which extends between the threaded portion 92 and a helical coupling portion 100. The helical coupling portion 100 is substantially identical to the helical coupling portions 24 and 70 of the embodiment of FIGS. 1, 2, and 3, 4, discussed above in detail. The helical coupling portion 100 comprises a continuous strip of convoluted metal helically wound about itself, with the strip comprising a convex ridge 102 disposed intermediate a pair of concave troughs 104, with the troughs overlying each other as the strip is helically wound. The resulting coupling portion is flexible to accommodate bending, and the like, as required in wiring applications. The coupling portion 100 is slightly larger than the flexible metal conduit with which it is designed to connect. The coupling portion terminates in an end 106 remote from the flange 94. The helical portion 100 defines a helical convoluted bore 101.

A lock element 120 is cut into one of the ridges 102 of the helical coupling portion 100, preferably adjacent the end 106 and generally remote from the flange 94. The lock element 120 is in the configuration of an elongated V, with a relatively narrow angle extending from an apex or point 122 rearwardly between a pair of sides of a notch 124. The apex of the lock element is in the direction of the helices from the end 106 of the helical coupling portion 100 towards the flange portion 94. Lock element 120 comprises a "V" shaped tab extending downwardly into the bore 101 from a ridge 102 of the helical coupling portion 100. The locking element 120 simply comprises a "V" shaped tab, cut or otherwise appropriately stamped or fabricated from a "V" shaped notch 124 through the strip of material out of which the helical coupler 100 is fabricated. The element 120 and the notch 124 may be compared to an arrow, or to the point of an arrow, extending in the direction of the helices from the end 106 toward the flange 94. The sides of the notch 124 extend rearwardly from a point 126 at a rather narrow diverging angle. The length of the notch may vary, according to the diameter of the coupler, the diameter of the conduit connected to the coupler, a thickness of the material, and other factors.

In FIG. 5 the locking element 120 is shown extending in an arcuate length of about seventy-five degrees. The lock element 120 may extend slightly downardly into the bore 101, and its inherent spring bias allows it to be moved upwardly into its groove in the ridge 102 as a flexible conduit, such as conduit 8 shown in FIG. 2, is threadedly inserted into the connector 90. However, when an attempt is made to remove or separate the flexible conduit from the connector, the apex 122, which is relatively sharp, digs into the conduit and resists the relative motion between the flexible conduit and the connector. Once the conduit is threaded into the bore 101 of the connector, pliers may be used, as discussed above, to move the lock element into positive engagement with the conduit.

Figure 6:
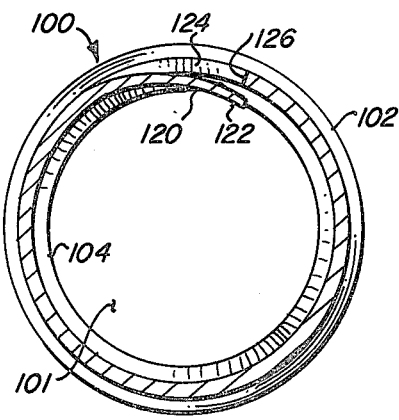
FIG. 6 is a view in partial section of the apparatus of FIG. 5 taken generally along line 6—6 of FIG. 5.

FIG. 6 is a view of the apparatus of FIG. 5 taken generaly along line 6—6. It comprises a view in partial section through the lock element 120 and the helical coupling portion 100 of the connector 90. The lock element 120 is shown extending downwardly from a ridge 102 into the convoluted bore 101 to a depth slightly below a trough 104. The actual depth to which the lock element 120 extends varies with the size of the conduit, the thickness of the wall of the strip of material out of which the conduit is made, and other factors. Similarly, the length of element 120 may also depend on various factors, such as the overall diameter of the connector, the general fit with respect to the size of the flexible conduit to be connected to the connector, and other factors.

The lock element or tab 120 extends into the bore 101 in a manner generally parallel to the convolutions of the helical coupling portion 100, rather than generally radially inwardly, as does the end 84 of the tab 80 of the embodiments of FIGS. 3 and 4. The lock element or tab 120 is terminated by a preferably sharp or pointed end or apex 122, as opposed to the relatively flat termination for the end portion 84 of the tab 80. And, since the tab or locking element 120 is integral with the helical coupling portion 100, the aperture out of which the tab or locking element is cut, and through which it extends, comprises the notch 124, which is of substantially the same shape and dimensions as is the locking element itself. The locking element simply extends downwardly into and through the aperture or notch and generally parallel to the helical convolutions which comprise the helical coupling portion or coupler 100.

In all three of the embodiments of the connector apparatus included herein, it is apparent that a constant grip is applied to the flexible conduit by the connector in two ways. The first grip is the threaded engagement of the conduit and the helical coupler or coupling portion. Both the conduit and the helical coupler are a series of helical corrugations or convolutions. The coupler is dimensioned to matingly engage the conduit by a threaded connection over virtually the entire length of the coupler, and over substantially the entire area of the interior bore of the coupler, which, due to the size of the corrugations or convolutions, is substantial.

The second grip is accomplished by the locking element through an aperture in the coupler. The aperture preferably extends through a convex ridge rather than through a concave trough. In two embodiments the aperture is simply a relatively small, round hole, and in one of the two embodiments the hole is threaded to receive a bolt. In the third embodiment the aperture is an elongated and pointed notch. The gripping action between the coupler and the conduit is from a tab secured to the coupler and extending through the aperture. The first "tab" is a bolt or screw extending through the tapped aperture and extending generally radially inwardly, but at an angle with respect to the longitudinal axis of the coupler and the conduit. The screw biases against a convex ridge or convolution of the conduit. The second tab is biased through an open aperture or hole also radially inwardly and at an angle with respect to the longitudinal axis of the conduit and of the coupler. The third tab extends into the bore of the coupler generally parallel to the helical convolutions and it includes a relatively sharp pointed end which contacts the conduit.

What is claimed is:

1. Connector apparatus for connecting flexible electrical conduit to a junction box, comprising, in combination:
   a cylindrical portion for securing to a junction box;
   a flange secured to the cylindrical portion;
   a first bore extending through the cylindrical portion and flange; and
   flexible helical coupling means secured to the flange and extending coaxially with the cylindrical portion, and including
      a second bore having a plurality of flexible helical convolutions communicating with the bore extending through the cylindrical portion and flange for threadedly engaging flexible electrical conduit, and
   lock means secured to the helical coupling means for locking the helical coupling means to the flexible electrical conduit and for insuring an electrical connection between the helical coupling means and the flexible electrical conduit, including
      an aperture extending through the helical coupling means, and
      a tab secured to the helical coupling means remote from the flange having a blade portion extending toward the flange and an end portion connected to the blade portion and extendable through the aperture radially inwardly into the second bore.

2. the apparatus of claim 1 in which the end portion of the tab extends from the blade of the tab at an obtuse angle adjacent the aperture.

* * * * *